Feb. 25, 1969 W. D. WOLF ET AL 3,429,733

METHOD OF MAKING A TRANSPARENT LAMINATE WHICH SELECTIVELY TRANSMITS AND REFLECTS RADIATION OVER EXTENDED SPECTRAL RANGES

Filed March 29, 1965

INVENTORS
WILLIAM D. WOLF
EDWARD H. MOTTUS
BY Robert J. Schaap
ATTORNEY

United States Patent Office 3,429,733
Patented Feb. 25, 1969

3,429,733

METHOD OF MAKING A TRANSPARENT LAMINATE WHICH SELECTIVELY TRANSMITS AND REFLECTS RADIATION OVER EXTENDED SPECTRAL RANGES

William D. Wolf and Edward H. Mottus, St. Louis, Mo., assignors to Monsanto Company, St. Louis, Mo., a corporation of Delaware Filed Mar. 29, 1965, Ser. No. 443,305
U.S. Cl. 117—33.3 16 Claims
Int. Cl. B29d *11/00;* C03c *17/28;* B32b *33/00*

ABSTRACT OF THE DISCLOSURE

The method of making of pellucid laminate which selectively transmits and reflects radiation over extended spectral ranges by depositing a dichroic filter on one flat surface of a panel. The filter is generally deposited by evaporation techniques and consists of multilayer dielectric films. Thereafter, a polymeric material selected from alkyl methacrylates and alkyl acrylates is polymerized on the upper surface of the filter and by low-temperature, low-pressure polymerization techniques. In order to accomplish this polymerization, a catalyst mixture containing boron compounds and peroxygen compounds is employed.

This invention relates in general to certain new and useful improvements in plastic laminates and more particularly to the method of protecting polymeric products from degradation and discoloration caused by solar radiation, by the use of multilayer dielectric films.

In the recent years, there has been an increasing tendency to substitute plastic sheets which are fairly rigid in their construction and are transparent in the visible light wave length range for glass. Plastic sheets formed of alkyl methacrylates and alkyl acrylates, have been found to be particularly useful in fenestration applications. However, the methacrylates and the acrylates are capable of ignition and, therefore, it is often necessary to incorporate flame retardants in the compositions.

However, the flame retardants which are presently employed are generally subject to degradation when subjected to solar radiation. It has been found that radiation contained within the "near infrared radiation range," that is the range of approximately 0.75 to 1.15 microns and radiation within the ultraviolet wave length range, that is radiation below 0.30 micron, is particularly damaging to the presently available flame retarding compounds. Moreover, radiation within the near infrared radiation wave length range and radiation contained in the ultraviolet wave length range also has a tendency to discolor methacrylate and acrylate sheets. After a relatively short period of time, the plastic sheet tends to turn slightly yellow and after continued exposure to solar radiation, the sheet will eventually become discolored to a point where it is almost no longer transparent.

It is, therefore, the primary object of the present invention to provide a method of protecting polymeric materials exposed to ultraviolet and infrared radiation from suffering the effects of degradation and discoloration.

It is another object of the present invention to provide plastic laminates formed of polymeric material and which are capable of resisting degradation and discoloration effects caused by solar radiation.

It is an additional object of the present invention to provide a method of protecting flame retardants and similar additives in plastic sheets from the harmful effects of ultraviolet and infrared radiation.

It is a further object of the present invention to provide a method of the type stated which is capable of increasing the useful life and utility of many polymeric materials.

It is another salient object of the present invention to provide plastic laminates which are capable of being constructed without creating any harm or disorientation to the multilayer film contained therein.

With the above and other objects in view, our invention resides in the novel features of form, construction, arrangement, and combination of parts presently described and pointed out in the claims.

Figure 1:
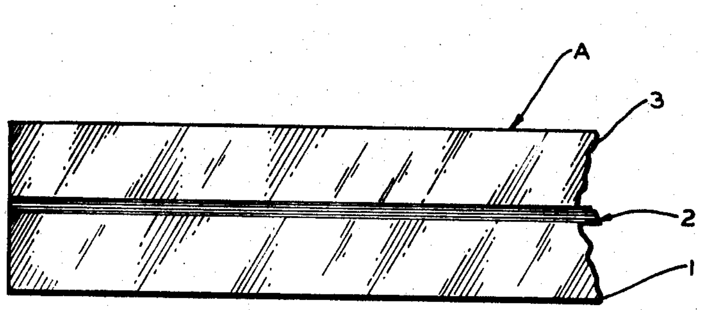
Figure 2:
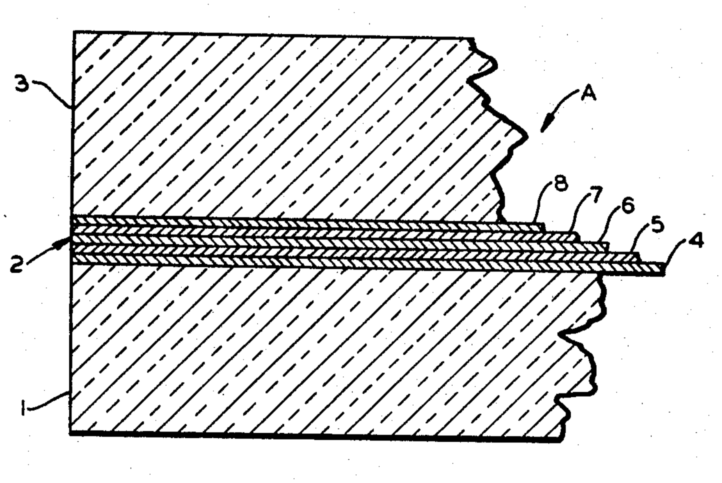

In the accompanying drawing (1 sheet):

FIGURE 1 is a schematic front elevational view broken away and in section of a plastic laminate constructed in accordance with and embodying the present invention; and FIGURE 2 is an enlarged sectional view showing the components in detail forming part of the plastic laminate.

Generally speaking, the present invention provides a laminate which includes an optical interference and absorption filtering means and a method of producing the laminate. As a more general application, the present invention provides a method of protecting polymeric materials from degradation and discoloration effects when exposed to ultraviolet and infrared radiation. In the practice of the present invention, a multilayer film, which is capable of reflecting radiation contained within the near infrared radiation wave length range and radiation within the ultraviolet wave length range is applied to one surface of a massive layer. This massive layer may be formed of glass or any suitable synthetic resinous material. Applied to the upper surface of the multilayer film is a liquid monomer of a suitable alkyl methacrylate or methacrylate copolymer which is polymerized on the surface of the multilayer film in the presence of a boron and peroxygen compound catalyst and in the presence of a suitable complexing agent.

Referring now in more detail to FIGURE 1, A designates a plastic laminate constructed in accordance with and embodying the present invention and which comprises a massive layer or panel 1 upon which has been deposited a dichroic filter, preferably a multilayer dielectric film 2, the latter to be hereinafter described in detail. Deposited on the upper surface of the multilayer film 2 is a polymerized massive layer or panel 3. The massive layer 1 may be formed of glass or it may be formed of any suitable plastic material which can be formed in accordance with the present invention. For example, the massive layer 1 may be formed of methyl methacrylate, or methyl acrylate, or any of the lower alkyl acrylates or lower alkyl methacrylates. The massive layer 1 can, of course, be formed by any suitable polymerization technique known in the prior art, such as by high temperature and high pressure polymerization. The lower alkyl methacrylates and lower alkyl acrylates, that is acrylates and methacrylates of up to 5 carbon atoms, are preferred inasmuch as alkyl methacrylates and alkyl acrylates having over 5 carbon atoms do not have sufficient rigidity. However, it should be understood that any massive layer, whether or not rigid, can be employed as long as it is transparent within the desired wave length range.

Suitably applied to the upper surface of the massive layer 1 by any conventional method is the multilayer film 2. The film can be applied by the chemical method of film deposition or by electrolytic deposition techniques and by the sputtering technique of film deposition. This latter technique has been found to be particularly effective in that it provides relatively even layers of film. This process consists of maintaining a discharge in an inert gas at a relatively high distention. The surface of a cathode being made part of the metal to be sputtered is subjected to local boiling which results from the bombardment of a cathode by positive ions. One of the most preferred methods and most extensively used is the deposition of films by thermal evaporation. Inasmuch as the multilayer film 2 is provided to protect the massive layers 1 and 3 from the harmful effects of solar radiation, it is designed to reflect radiation within the ultraviolet wave length range, that is, radiation which has a wave length range of less than 0.30 micron. The multilayer film 2 is also designed to reflect radiation in the near infrared radiation wave length range, that is radiation contained with the wave length range of 0.70 micron to 1.15 microns. Naturally, the film is designed to transmit radiation within the visible length wave length range, that is radiation contained with the band of 0.30 to 0.70 micron.

Multilayer dielectric films which have been found to be effective to transmit the desired wave length radiation and reflect the desired wave length radiation are those multilayer films which consist of alternating layers of materials having high refractive indices and materials having low refractive indices. Thus, the film 2 consists of a lower layer of a high index of refraction material 4, followed by a low index of refraction material 5, and which is, in turn, followed by a high index of refraction material 6. Deposited on the layer 6 is a layer 7 having a low index of refraction followed by a layer 8 having a high refractive index. Thus, the multilayer film 2 consists of 5 layers, three of which are alternating high index of refraction material and two of which are alternating low index of refraction material. It should be understood in this connection that any number of layers could be employed in the multilayer dielectric film 2 so long as each of the layers was designed to achieved the desired reflectivity and the desired transmission of radiation.

The layers formed of high refractive index material may preferably be formed of any of those compounds included within copending application Ser. No. 311,992, field Sept. 22, 1963, and which relates to optically thin films. The high refractive index materials consist of a group of dimetallic salts of the general formula $XYO_4$ having four oxygen atoms. Included within this group of compounds are tin molybdate ($SnMoO_4$); tin tungstate ($SnWO_4$), tin chromate ($SnCrO_4$); cadmium molybdate ($CdMoO_4$); cadmium tungstate ($CdWO_4$); cadmium chromate ($CdCrO_4$); lead molybdate ($PbMoO_4$); lead chromate ($PbCrO_4$).

It can be seen that each of the above listed compounds contains four oxygen atoms and a single atom of each of two metals. Moreover, each of the compounds is formed by a combination of metals of two classes X and Y, the first class X consisting of tin, cadmium and lead; and the second class Y consisting of molybdenum, tungsten and chromium. It should be noted that each of these compounds contains heavy elements which have a large number of electrons surrounding the nucleus and thereby provide compounds with a high index of refraction. Furthermore, these compounds possess a high degree of volatility. It should be understood that solid solutions of any of the aforementioned compounds also effectively serve as layers of high index of refraction material. However, it should be understood that the high index of refraction layers are not specifically limited to the materials listed. While the materials listed above are preferred, any dielectric material having a high index of refraction can be employed.

The layers 5 and 7 may be formed of any material having a low refractive index, such as magnesium fluoride, cryolite, calcium fluoride, lithium fluoride, aluminum fluoride, calcium silicate, and aluminum oxide.

In connection with the present invention, it has been found that by forming each of the high refractive index layers 4, 6 and 8 and each of the low refractive index layers 5 and 7 with optical thicknesses of a quarter-wave length for the maximum wave length to be reflected at the center of the principal reflectance band, optimum results are obtained. Thus, for quarter-wave length low refractive index layers, the thickness can be determined by the following relationship:

$$t_L = \lambda_0 / 4n_L$$

where $t_L$ represents a thickness of the low index of re-refraction layers, $\lambda_0$ represents a wave length to be reflected at the center of the principal reflectance band, and $n_L$ represents the refractive index of the low refractive index layers. Similarly for quarter-wave high refractive index layers, the thickness can be determined by the following relationship:

$$t_H = \lambda_0 / 4n_H$$

where $t_H$ represents the thickness of the high refractive index layers, and $n_H$ represents the index of refraction of the high refractive index layers.

The method of calculating the thickness of each of the layers forming the multilayer film 2 is more fully set forth in copending application Ser. No. 299,851, filed Aug. 5, 1963, and relates to the suppression of pass band reflectance of multilayer films. In said copending application, it was also described that a terminating layer can be employed to reduce maximum subsidiary reflections which are undesirable in multilayer films. It should be understood that the terminating layer described in said copending application can also be deposited on the multilayer film in the present invention. It should be understood that the multilayer films which can be employed in the practice of the present invention are not specifically limited to the types of film herein described or to the materials forming the layers herein described, but any suitable multilayer film can be employed which is capable of reflecting infrared radiation and ultraviolet radiation of the type described and of passing visible light radiation. One of the most suitable multilayer dielectric filters employed is that consisting of alternating layers of lead oxide and cryolite since this type filter has been found to be very efficient in reflecting infrared and ultraviolet wave lengths of radiation.

A suitable flame retardant may be incorporated within the panel. Many of the available phosphorous containing flame retardant and flameproofing compositions are useful for incorporation into the panel 1. It has been found that the application of the multilayer dielectric film 2 prevents the decomposition and deterioration of the flameproofing compositions contained within the panel 1. Those flameproofing compositions which are particularly useful are of the type described in United States Letters Patent No. 3,014,944 and relates to compounds having both trivalent phosphorus and pentavalent phosphorus ester groups. For example, such useful flame retardant compounds which can be incorporated in the panel 1 are:

bis[1-(dipropylphosphinyl)hexyl]ethylphosphonite,
bis[α-(diallylphosphinyl)benzyl]hexylphosphite,
bis{1-[bis(3-methylbutyl)phosphinyl]2-propenyl}S-naphthyl-phosphorothioite,
bis{α-[(2-butenyl)phenylphosphinyl]furfuryl}diethyl-phosphonamidite,
bis[1-(dibenzylphosphinyl)-4-chlorobutyl]dimethyl-phosphoramidite,
bis[α-(dimethylphosphinyl)-4-ethoxybenzyl]morpholino-phosphonite Similarly, it has been found that the following group of compounds are also useful as flame retardants in the present invention.

tris[1-(methoxymethylphosphinyl)butyl]phosphite,
tris{1-[(2-chloro-propoxy)(2-chloro-propyl)phosphinyl]octyl}phosphite,
tris{1-[(2-chlorooctyl)cyclohexylphosphinyl]decyl}phosphite
tris{1-[(2-butenyloxy)(2-butenyl)phosphinyl]amyl}phosphite,
tris{1-[(6-hexynyloxy)(6-hexynyl)phosphinyl]amyl}phosphite, tris[(phenoxyphenylphosphinyl)methyl]phosphite,
tris[1-(octyloxybenzylphosphinyl)-2-methylpropyl] phosphite
tris{1-[(2-phenylethoxy)(4-biphenylyl)phosphinyl] butyl}phosphite,
tris{1-[(2-chloro-4-heptenyloxy)ethylphosphinyl] methyl}phosphite,
tris{1-[(ethoxethoxy)(ethoxyethyl)phosphinyl]nonyl} phosphite,
tris{1-[(dodecycloxy)(3-dodecenyl)phosphinyl]propyl} phosphite
tris{1-[(2-ethylhexyloxy)(2-naphthyl)phosphinyl]butyl} phosphite,
tris{1-[(4-chlorobenzyloxy)(4-chlorobenzyl) phosphinyl]amyl}phosphite.

Similarly, it has been found that very useful flame retardant compositions which can be employed in the practice of the present invention are of the type described in U.S. Patent No. 3,014,956 and in Patent No. 3,132,169. The most useful flame retardant compositions which can be used in the present invention are the compositions containing a halogenated diphosphate of the type described in United States Letters Patent No. 3,157,613. These compounds have been found to be the most effective in methyl methacrylate type polymers. Particularly, such useful compounds are:

2,2-bis(chloromethyl)-1,3 - propylenebis(phosphorodichloridate) obtained by reaction of chlorine with the reaction product of pentaerythritol and phosphorus trichloride;

2,2-bis(chloromethyl) - 1,3 - propylenebis(phosphorobromidochloridate) obtained by reaction of chlorine with the reaction product of pentaerythritol and phosphorus tribromide;

2,2-bis(bromomethyl) - 1,3 - propylenebis(phosphorobromidochloridate) obtained by reaction of bromine with the reaction product of pentaerythritol and phosphorus trichloride; and 2,2-bis(bromomethyl)-1,3.- propylenebis(phosphorodibromidate) obtained by reaction of bromine with the reaction product of pentaerythritol and phosphorus tribromide.

A few examples of the type II compounds in United States Letters Patent No. 3,157,613 which are particularly useful as flame retardants in the present invention are:

2,2-bis(chloromethyl)-1,3-propylenebis[bis(2 - chloroethyl)phosphate] obtained by reaction of ethylene oxide with 2,2-bis(chloromethyl)-1,3-propylenebis(phosphorodichloridate); 2,2-bis(chloromethyl)-1,3-propylene-bis[2-bromopropyl 2-chloropropyl phosphate] obtained by reaction of propylene oxide with 2,2-bis-(chloromethyl)-1,3-propylenebis(phosphorobromidochloridate);

2,2-bis(bromomethyl)-1,3- propylenebis[2,3-dichloro - propyl 2-bromo-3-chloropropyl phosphate] obtained by reaction of epichlorohydrin with 2,2-bis(bromoethyl)-1,3-propylenebis(phosphorobromidochloridate);

2,2-bis(bromomethyl)-1,3-propylenebis(3-phenoxy- 2 - chloropropyl 3-phenoxy - 2 - bromopropyl phosphate) obtained by reaction of phenyl glycidyl ether with 2,2-bis - (bromomethyl) - 1,3 - propylenebis(phosphorobromidochloridate); and 2,2-bis(bromomethyl)-1,3-propylenebis[bis(2- bromo-3-butenyl)phosphate] obtained by reaction of butadiene-monoxide with 2,2-bis(bromomethyl)-1,3-propylenebis-(phosphorodibromidate).

It should also be understood in connection with the present invention that the panel 1 may be provided with various coloring agents or suitable additives of the type which are normally employed in the formation of glass or transparent polymeric panels such as methyl methacrylate panels.

After the multilayer dielectric film 2 has been deposited on the panel 1, the marginally registered members are then placed in a suitable mold for receiving the outer panel 3 forming part of the laminate. The panel 3 is formed by the low temperature polymerization of suitable alkyl methacrylates hereinafter described on the upper surface of the multilayer dielectric film 2. The panel 3 may be formed of any desired thickness so long as it is sufficiently thick to constitute a massive plastic layer so that it does not interfere with the optics of the multilayer dielectric film 2. The panel 3 may be suitably formed of any alkyl polymethacrylate where the alkyl group has from 1 to 5 carbon atoms. Such useful monomers which can be employed in the formation of the panel 3 are methyl methacrylate, ethyl methacrylate, isopropyl methacrylate, normal-propyl methacrylate, normal-butyl methacrylate, secondary butyl methacrylate, and tert-butyl methacrylate. Similarly useful are the pentyl methacrylates. It has been found that any alkyl methacrylate with greater than 5 carbon atoms in the alkyl group does not in itself possess sufficient rigidity for the purpose of the present invention.

It has been found that copolymers of methyl methacrylate with other suitable methacrylates can also be employed in the formation of the panel 3. Suitable methacrylate copolymers containing up to lauryl methacrylate can be successfully employed as the panel 3 as long as there is sufficient amount of methyl methacrylate or any lower alkyl methacrylate to provide sufficient rigidity to the panel. Such suitable copolymers which are useful in the present invention are methyl methacrylate, lauryl methacrylate copolymers, ethyl methacrylate/lauryl methacrylate copolymers, propyl methacrylate/lauryl methacrylate copolymers, methyl methacrylate/octyl methacrylate copolymers, ethyl methacrylate/octyl methacrylate copolymers and propyl methacrylate/octyl methacrylate copolymers.

It has been found that copolymers of acrylates and methacrylates can also be employed in the formation of the panel 3. Representative samples of such copolymers are: methyl acrylate/methyl methacrylate, ethyl acrylate/ethyl methacrylate, n-propyl acrylate/n-propyl methacrylate, isopropyl acrylate/isopropyl methacrylate, butyl acrylate/butyl methacrylate, tert-butyl acrylate/tert-butyl methacrylate, etc.

Other suitable copolymers which can be used in the present invention are methyl acrylate/lauryl acrylate, methyl acrylate/octyl acrylate, ethyl acrylate/octyl acrylate, n-propyl acrylate/octyl acrylate, sec-butyl acrylate/octyl acrylate, tert-butyl acrylate/octyl acrylate, etc.

Additional copolymers which can be used in the formation of the panel 3 are: dimethacrylates such as ethylene glycol dimethacrylate, propylene glycol dimethacrylate, n-butylene glycol dimethacrylate, sec-butylene glycol dimethacrylate, tert-butylene glycol dimethacrylate, dipropylene glycol dimethacrylate, tripropyl glycol dimethacrylate, tetrapropylene glycol dimethacrylate, dibutylene glycol dimethacrylate, tributylene glycol dimethacrylate, tetrabutylene glycol dimethacrylate, dimethylene glycol dimethacrylate, triethylene glycol dimethacrylate, tetraethylene glycol dimethacrylate, di-n-butylene glycol dimethacrylate, di-sec-propylene glycol dimethacrylate, di-tert-butylene glycol dimethacrylate, tetra-n-butylene glycol dimethacrylate, tetra-sec-butylene glycol dimethacrylate, tetra-tert-butylene glycol dimethacrylate, etc. This latter group of compounds is particularly useful inasmuch as they provide good solvent resistance and aid in cross linking. The above copolymers are only representative of a few of the copolymers which can be employed in the formation of the panel 3. In each case, there should be a sufficient amount of the lower alkyl methacrylate to provide the rigidity necessary for the panel 3. Naturally, to make any of the above copolymers, the suitable monomers must be added; for example, if it were desired to make a copolymer of methyl methacrylate/lauryl methacrylate, it would require approximately 80 to 95% of methyl methacrylate and correspondingly 20 to 5% of lauryl methacrylate.

The monomer or each of the monomers are then added to the mold so that they are polymerized on the surface of the multilayer dielectric film 2. It has been found that by employment of a catalyst system hereinafter described, it is possible to polymerize the methacrylate system within 20 minutes to 1 hour at room temperature in a relatively inert atmosphere. The catalysts which are particularly useful in creating the room temperature copolymerization of alkyl methacrylate systems are described in copending application Ser. No. 79,672 filed Dec. 30, 1960, and application Ser. No. 425,958 filed Jan. 15, 1965. Such catalysts which are suitable to polymerize olefinic compounds of the type mentioned, are boron compounds used with peroxygen compounds. Complexing agents formed of amines such as pyridine or complexing agents of comparable basicity material increases the rate of conversion to high yields of polymer. At least a sufficient amount of complexing agent should be used to increase conversion as compared to no complexing agent and normally, 0.1 to 10 moles of complexing agent per mole of boron compound should be employed. However with about an equivalent amount or a molar amount depending upon the complexing agent, normally produces optimum results. Therefore in the preferred range, the amines or complexing agents in the boron compound are used at about a 1:1 molar ratio, assuming there is one nitrogen function per boron function in each of these compounds, i.e., equivalent amounts in analogy to acids and bases. The boron compounds particularly useful in the process of the present invention are those having an organo group attached by carbon directly to the boron, i.e. organoboron compounds.

Boron compounds particularly useful in the process of the present invention as catalyst components are compounds of the general formulas: $R_3B$, $RB(OR)_2$, $R_2(OR)$, $R_2BOBR_2$, $R_2BX$, $R_2BH$ and the like where R is a hydrocarbon radical preferably an alkyl radical having from 1 to 10 or more carbon atoms and X is halogen. The R's can be the same or different. An illustrative but nonlimiting list of suitable boron compounds is the following: trimethyl boron, triethyl boron, tri-n-propyl boron, triisopropyl boron, triisobutyl boron, tri-n-butyl boron, tri-t-butyl boron, tri-n-hexyl boron, tri-n-octyl boron, butyl diethyl boron, tricyclohexyl boron, tridecyl boron, triphenyl boron, the tritolyl boron, the trixylyl boron, the trinaphthyl boron, tribenzyl boron, n-butyl di-n-butyl boronite, di-n-butyl n-butyl boronite, di-n-butyl boron oxide, di-n-butyl n-butyl boronate, di-n-butyl boron bromide, di-n-butyl boron chloride, diethyl boron hydride, etc.

Any peroxide or hydroperoxide may be used as a catalyst component in the process of the invention. Illustrative of the suitable peroxides are the following: hydrogen peroxide, benzoyl peroxide, dicumyl peroxide, cumene hydroperoxide, peracetic acid, lauryl peroxide, urea hydroperoxide, t-butyl hydroperoxide, t-butyl perbenzoate, 2,4-dichlorobenzyl peroxide, diethyl peroxide, ethyl hydroperoxide, succinic mono peracid, etc.

As complexing agents for the process of the invention, compounds having basicities in the range of less than $10^{-5}$ and greater than $10^{-11}$, preferably in the range of about $10^{-6}$ or $10^{-7}$ to $5\times10^{-10}$ or $10^{-10}$ are useful. Enumerated below are a number of such suitable compounds which are meant to be merely illustrative and not limiting of the invention. Ionization constants for these compounds are found in Lange's Handbook of Chemistry, 9th edition, pages 1202–4 (1956). The complexing agents are: aniline, apomorphine, benzidine, beryllium hydroxide, brucine, cinchonidine, cinchonine, cocaine, codeine, creatine, creatinine, dimethylaminoantipyrine, dimethylbenzylamine, emetine, hydrastine, hydrazine, hydroquinine, hydroxylamine, morphine, α-naphthylamine, β-naphthylamine, narceine, narcotine, nicotine, novocain, papaverine, p-phenetidine, o-phenylenediamine, p-phenylenediamine, phenylhydrazine, physostigmine, philocarpine, pyridine, quinidine, quinine, quinoline, semicarbazide, solanine, strychnine, thebaine, o-toluidine, m-toluidine, p-toluidine, veratrine, etc.

Also polymers or copolymers of such monomers as vinyl pyridine will have basicities within the useful range and these polymers will be useful complexing agents for the process of the invention. Difunctional amines such as quinidine having both functional groups with ionization constants within the desired range might be used in about ½ the molar amount that, e.g. pyrdine would be used, and other amines which are correspondingly polyfunctional may be used in equivalent rather than molar amounts; however, where the higher ionization constant of a difunctional amine is nearer to optimum for highest conversion, it still may be desirable to use a molar amount since the higher ionization constant nitrogen will tend to complex all the boron compound and promote the conversion to the highest degree.

Thus, in the process of the present invention, the panel 1 with the multilayer dielectric film 2 there applied is then suitably placed in the mold so that the panel 3 may be suitably formed thereon. It can be seen that the panel 3 is formed by the low temperature polymerization of any suitable alkyl methacrylate polymer or alkyl methacrylate copolymer system by means of the described catalyst system. It has been found that polymerization takes place at room temperatures, that is temperatures within the range of 20° C. to 50° C., in an inert atmosphere in approximately 20 minutes to an hour, depending upon the thickness of the layer formed and upon the types of monomers employed. By polymerizing the last panel forming part of the laminate directly upon the multilayer dielectric film 2, the film 2 remains unaffected thereby.

Heretofore, it has been difficult, if not impossible to laminate an outer panel to a multilayer dielectric film without cracking the film and disorienting the particles thereof so that the effectiveness of the interference filter is somewhat destroyed. Moreover, the present invention provides a suitable method of protecting any flameproofing composition or additive which may be incorporated in the panel 1 during the formation thereof. As an alternative, any of the aforementioned flameproofing compositions or additives normally employed in panels of the type described, can be added to the monomer system which is polymerized to form the panel 3. The flame retardant compounds of the type described are generally added to the monomers in an amount of approximately 17 to 25 percent by weight. It should also be obvious that this technique for protecting infrared and ultraviolet sensitive materials from damage by solar radiation, or other undesirable radiation can be applicable to sheets, films, molded shapes and structural units as well.

The invention is further illustrated by but not limited to the following example.

EXAMPLE

A polymethyl methacrylate sheet having an overall thickness of ⅛" was employed as the lower massive panel in a transparent laminate. The methacrylate sheet was transparent in the visible light wave length range and incorporated therein was approximately 17.5 percent by weight of a flame retardant consisting of a mixture of a polyphosphonate of the formula

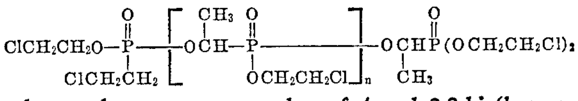

where *n* has an average value of 4 and 2,2-bis(bromomethyl)-1,3-propylenebis(2-bromoethyl 2 - chloroethyl phosphate). The two compounds are mixed on a 1:1 weight ratio.

A seven layer dielectric film consisting of alternating layers of lead oxide and cryolite was thereafter deposited on the upper surface of the methyl methacrylate panel. The multilayer dielectric film employed a first layer of lead oxide having an overall thickness of ¼ of the maximum wave length to be reflected at the center of the principal reflectance band was deposited by means of vacuum evaporation deposition techniques. Thereafter a layer of cryolite was deposited on the layer of lead oxide. Similarly, three additional alternating layers of lead oxide were deposited and interposed between the three layers of lead oxide were two layers of cryolite. Each of the layers of lead oxide had an overall thickness of approximately ¼ of the maximum wave length to be reflected at the center of the principal reflectance band and each of the layers of cryolite had an overall thickness of approximately ¼ of the maximum wave length to be reflected at the center of the principal reflectance band.

Thereafter, the massive panel with the multilayer dielectric film deposited thereon was placed within a suitable mold and thereafter placed within a nitrogen box. A mixture consisting of 25 grams of tetraethylene glycol dimethacrylate, 47.5 grams of methyl methacrylate and 0.22 milliliter of cumene hydroperoxide was deposited on the upper surface of the multilayer dielectric film. Thereafter, 0.5 milliliter of a 2 molar triethyl boron/pyridine complex in hexane was added to the mixture. The layer was smoothed out to a thickness of approximately 0.006″ with a doctor blade and then allowed to polymerize at room temperature of approximately 23° for one hour. The layer deposited thereon produced a relatively hard massive layer which did not interfere with the optics of the system. Moreover, the polymerizing of the upper layer did not in any way interfere with the multilayer dielectric film.

It should be understood that changes and modifications in the form, construction, arrangement and combination of parts presently described and pointed out may be made and substituted for those herein shown without departing from the nature and principle of our invention.

Having thus described our invention what we desire to claim and secure by Letters Patent is:

1. The method of making a pellucid laminate for selective reflectance and transmittance of radiation over an extended spectral range, said method comprising depositing a dichroic filter on one flat surface of a panel which is transparent in the wavelength range of radiation to be transmitted, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

2. The method of claim 1 further characterized in that the panel is glass.

3. The method of claim 1 further characterized in that the panel is formed of a member selected from the class consisting of alkyl methacrylates and alkyl acrylates.

4. The method of claim 1 further characterized in that the member is alkyl acrylate.

5. The method of claim 1 further characterized in that the member is alkyl methacrylate.

6. The method of making a pellucid laminate for selective reflectance and transmittance or radiation over an extended spectral range, said method comprising depositing a dichroic filter on one flat surface of a panel which is transparent in the wavelength range of radiation to be transmitted, and polymerizing a member selected from the class consisting of alkyl acrylates and alkyl methacrylates in the presence of a catalyst mixture and an amine complexing agent on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

7. The method of making a pellucid laminate for selective reflectance and transmittance of radiation over an extended spectral range, said method comprising depositing a dichroic filter on one flat surface of a panel which is transparent in the wavelength range of radiation to be transmitted, and polymerizing a member selected from the class consisting of alkyl acrylates and alkyl methacrylates in the presence of a catalyst mixture and a pyridine complexing agent on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

8. The method of making a pellucid laminate for selective reflectance and transmittance of radiation over an extended spectral range, said method comprising depositing a filter including multilayer dielectric films on one flat surface of a panel which is transparent in the wavelength of radiation to be transmitted, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

9. The method of making a pellucid laminate for selective reflectance and transmittance of radiation over an extended spectral range, said method comprising depositing a dichroic multi-layer dielectric filter having alternating layers of materials with high and low indices of refraction on one flat surface of a panel which is transparent in the wavelength range of radiation to be transmitted, and polymerizing a member selected from the class consisting of alkyl acrylates and alkyl methacrylates in the presence of a catalyst mixture on the upper surface wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

10. The method of making a pellucid laminate for selective reflectance and transmittance of radiation over an extended spectral range, said method comprising depositing a dichroic multi-layer dielectric filter having alternating layers of material with high and low indices of refraction on one flat surface of a panel which is transparent in the wavelength range of radiation to be transmitted, the layer of material with a high index of refraction being deposited with a thickness of one-fourth wavelength, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

11. The method of making a pellucid laminate for selective reflectance and transmittance of radiation over an extended spectral range, said method comprising depositing a dichroic multi-layer dielectric filter having alternating layers of materials with high and low indices of refraction on one flat surface of a panel which is transparent in the wavelength range of radiation to be transmitted, the layer of material with a high index of refraction being deposited with a thickness of one-fourth wavelength, the layer of material with a low index of refraction being deposited with a thickness of one fourth wavelength, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$. $R_2B(OR)$, $R_2BOBR_2$, $R_2BX$ and $R_2BH$ where R is an alkyl radical and X is a halogen thereby forming a pellucid laminate.

12. The method of making a pellucid laminate for selective reflectance and transmittance of radiation over an extended spectral range, said method comprising depositing a dichroic multi-layer dielectric filter having alternating layers of lead oxide and cryolite on one flat surface of a panel which is transparent in the wavelength range of radiation to be transmitted, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

13. The method of making a pellucid laminate for selective reflectance and transmittance of radiation over an extended spectral range, said method comprising depositing a dichroic filter on one flat surface of a panel which is transparent in the wavelength range of radiation to be transmitted, and polymerizing a member selected from the class consisting of lower alkyl acrylates and lower alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

14. The method of making a pellucid laminate for selective reflectance and transmittance of radiation over an extended spectral range, said method comprising depositing a dichroic filter on one flat surface of a panel which is transparent in the wavelength range of radiation to be transmitted, incorporating a flame proofing composition in a polymerizable compound selected from the class consisting of alkyl acrylates and alkyl methacrylates, polymerizing said compound with said composition therein on the upper surface of said filter in the presence of a catalyst mixture to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

15. The method of making a pellucid laminate for selective reflectance of radiation in the ultraviolet and infrared wave length ranges and transmittance of radiation in the visible wavelength range, said method comprising depositing a dichroic filter on one flat surface of a panel which is transparent in the wavelength range of radiation to be transmitted, and polymerizing a member selected from the class consisting of alkyl acrylates and alkyl methacrylates in the presence of a catalyst mixture on the upper surface of the dichroic filter to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

16. The method of making a pellucid laminate for selective reflectance of radiation in the ultraviolet and infrared wavelength ranges and transmittance of radiation in the visible wavelength range, said method comprising depositing a multilayer dielectric dichroic filter having alternating layers of materials with high and low indices of refraction, on one flat surface of a panel which is transparent in the wavelength range of radiation to be transmitted, the layers of materials with the high and low indices of refraction each being deposited with a thickness of one-fourth wave-length, incorporating a flameproofing composition in a polymerizable compound selected from the class consisting of lower alkyl acrylates and lower alkyl methacrylates, polymerizing said compound with said composition therein on the upper surface of said filter in the presence of a catalyst mixture to produce a transparent panel, wherein said catalyst mixture comprises a peroxide compound and a boron compound selected from the class consisting of boron compounds of the general formula $R_3B$, $RB(OR)_2$, $R_2B(OR)$, $R_2BOBR_2$, $R_2BX$ and $R_2BH$ where R is an alkyl radical and X is a halogen thereby forming a pellucid laminate.

References Cited

UNITED STATES PATENTS

| | | | |
|---|---|---|---|
| 2,046,886 | 7/1936 | Strain | 117—161 |
| 2,632,758 | 3/1953 | Brothman | 117—126 |
| 3,290,203 | 12/1966 | Antonson et al. | 117—33.3 X |
| 3,147,132 | 9/1964 | Geffcken | 117—33.3 |
| 3,176,575 | 4/1965 | Socha | 117—33.3 X |
| 3,185,020 | 5/1965 | Thelen | 117—33.3 X |
| 3,188,513 | 6/1965 | Hansler | 117—33.3 X |
| 3,202,054 | 8/1965 | Mochel | 117—33.3 |
| 3,271,179 | 9/1966 | Smith | 117—33.3 |
| 3,356,522 | 12/1967 | Libbert | 117—33.3 |
| 3,356,523 | 12/1967 | Libbert | 117—33.3 |

WILLIAM D. MARTIN, *Primary Examiner.*

PAUL ATTAGUILE, *Assistant Examiner.*

U.S. Cl. X.R.

117—72, 124, 136, 138.8, 161; 161—1